(12) United States Patent
Kieser et al.

(10) Patent No.: US 8,034,864 B2
(45) Date of Patent: Oct. 11, 2011

(54) OPAQUE PLASTICS

(75) Inventors: Manfred Kieser, Darmstadt (DE); Markus Schum, Reichelsheim (DE)

(73) Assignee: Merck Patent GmbH, Darmstadt (DE)

( * ) Notice: Subject to any disclaimer, the term of this patent is extended or adjusted under 35 U.S.C. 154(b) by 530 days.

(21) Appl. No.: 11/665,649

(22) PCT Filed: Sep. 21, 2005

(86) PCT No.: PCT/EP2005/010182
§ 371 (c)(1),
(2), (4) Date: Apr. 18, 2007

(87) PCT Pub. No.: WO2006/042610
PCT Pub. Date: Apr. 27, 2006

(65) Prior Publication Data
US 2007/0289496 A1    Dec. 20, 2007

(30) Foreign Application Priority Data
Oct. 19, 2004   (DE) .................... 10 2004 051 104

(51) Int. Cl.
| | |
|---|---|
| C04B 14/04 | (2006.01) |
| C09C 1/62 | (2006.01) |
| C09C 1/00 | (2006.01) |
| C09C 1/36 | (2006.01) |
| C09C 1/22 | (2006.01) |
| B32B 5/16 | (2006.01) |
| B32B 9/00 | (2006.01) |
| B32B 15/02 | (2006.01) |
| B32B 17/02 | (2006.01) |
| B32B 37/30 | (2006.01) |
| C08K 5/09 | (2006.01) |
| C08K 5/04 | (2006.01) |
| C08K 5/34 | (2006.01) |
| C08K 5/45 | (2006.01) |
| C08K 5/00 | (2006.01) |

(52) U.S. Cl. ........ 524/400; 106/404; 106/415; 106/436; 106/457; 106/481; 106/482; 524/86; 524/88; 524/93; 524/394; 524/442; 428/406

(58) Field of Classification Search ................. 106/31.9, 106/404, 415, 436, 457, 481, 483, 278.19; 428/403, 406; 524/86, 88, 93, 394, 400, 524/442
See application file for complete search history.

(56) References Cited

U.S. PATENT DOCUMENTS

| | | | | |
|---|---|---|---|---|
| 6,291,551 B1 | * | 9/2001 | Kniess et al. ................. | 523/216 |
| 2004/0170838 A1 | * | 9/2004 | Ambrosius et al. ........... | 428/406 |
| 2007/0060668 A1 | * | 3/2007 | Schoenefeld et al. ........ | 523/160 |

FOREIGN PATENT DOCUMENTS

| | | | |
|---|---|---|---|
| JP | 11 130979 A | | 5/1999 |
| WO | WO 02/090448 | * | 11/2002 |
| WO | WO 03/006558 A | | 1/2003 |
| WO | WO 2004/104110 | * | 12/2004 |
| WO | WO 2005/019327 | * | 3/2005 |

\* cited by examiner

Primary Examiner — Anthony Green
Assistant Examiner — Pegah Parvini
(74) Attorney, Agent, or Firm — Millen, White, Zelano, Branigan, P.C.

(57) ABSTRACT

The present invention relates to opaque plastics comprising effect pigments which are distinguished by the fact that they have high gloss and virtually no visible or no visible flow lines.

12 Claims, No Drawings

OPAQUE PLASTICS

The present invention relates to opaque plastics comprising effect pigments which have high gloss in the end products, but have virtually no or no visible flow lines and weld lines.

Flow lines and weld lines are a problem in the processing of thermoplastics, in particular in injection moulding. In this principle of moulding production, mould cavities formed corresponding to the mouldings to be manufactured are filled with melt. In order to ensure high product quality, i.e. both adequate strength throughout the moulding and also optical homogeneity, it is necessary to achieve intimate mixing of the melt strands at the weld lines, i.e. the places in the moulding at which the previously separated melt strands meet one another again.

DE 100 52 841 A1 discloses, for example, setting the individual melt strands in vibration or pulsation, at least in sections, with the result that the melts permeate themselves in the region of the weld lines owing to the vibration differences, and the weld lines form an intensive bond with one another at the join site of the melt strands.

WO 2004/073950 describes an injection unit in which at least two melt streams are fed alternately one after the other via a channel system to one or more mould cavities in order to minimise the problem of the flow lines.

The technical methods described in the prior art for suppressing flow lines are generally not suitable in the case of plastics comprising effect pigments. Problems during injection moulding occur, in particular, if flake-form effect pigments are added to the plastics. Inhomogeneous pigment orientations and thus visually clearly visible defects in the form of weld lines and flow lines in the plastic then arise.

The object of the present invention is to provide opaque plastics coloured by means of effect pigments and having a low level of flow lines.

Surprisingly, it has now been found that the visibility of flow lines and weld lines in opaque plastics can be reduced with the aid of specific pigment formulations. The addition of effect pigments based on glass flakes to opaque or relatively opaque colourings of plastics enables the flow lines and weld lines to be rendered virtually invisible.

The invention therefore relates to opaque plastics comprising effect pigments which, in contrast to relevant experience, in spite of a clearly visible gloss effect, have virtually no visible or no visible flow lines or weld lines in the end products.

Effect pigments based on glass flakes are distinguished by particularly bright gloss. Since flow lines and weld lines are generally invisible in opaque coloured plastics, this observation is combined with the bright gloss properties of coated glass flakes. In this way, weld lines and flow lines can be rendered completely or substantially invisible, depending on the hiding power or basic colouring of the plastic.

Although the gloss effects of effect pigments based on glass flakes are not as bright in opaque or opaquely coloured plastics as in a highly transparent plastic material, novel potential effects can now be developed for the plastic parts in which the use of flake-form effect pigments has hitherto not been accepted owing to the flow lines and weld lines perceived as visually very interfering.

In this application, opaque or opaquely coloured plastics are taken to mean plastics which, for a layer thickness of 1.5 mm, have a transmission of max. 20%, preferably of ≦15%, in particular of ≦10%, measured after adjustment to 100% using a translucer from Gabriel Chemie.

All effect pigments based on glass flakes that are known to the person skilled in the art are suitable, in particular those as described, for example, in U.S. Pat. No. 3,331,699, WO 97/46624, JP H7-759, WO 02/090448, WO 03/006558, WO 2004/055119.

Particular preference is given to extremely bright, coarse effect pigments based on glass flakes having a thickness of 0.5-10 µm, in particular 0.5-5 µm. The size in the two other dimensions is usually 5-400 µm, preferably 10-300 µm and in particular 20-200 µm. Very particular preference is given to effect pigments having a thickness of <3 µm, in particular <1.5 µm. Particularly suitable are coarse effect pigments having a face diameter of 10-300 µm and a thickness of <3 µm or those having a diameter of 20-200 µm and a thickness of <1.5 µm.

The glass flakes having these dimensions can be produced, for example, by the process described in EP 0 289 240 B1.

The glass flakes may consist of all glass types known to the person skilled in the art, such as, for example, window glass, C glass, E glass, ECR glass, Duran® glass, aluminium borosilicate glass, laboratory equipment glass or optical glass. Particular preference is given to borosilicate glass, C glass or ECR glass. The refractive index of glass flakes is preferably 1.45-1.80, in particular 1.50-1.70.

It is frequently advisable to protect the glass flakes against chemical modification, such as swelling, leaching-out of glass constituents or dissolution in the aggressive acidic coating solutions, on the surface by means of an $SiO_2$ coating. During the calcination process, intimate bonding of the chemically related materials occurs in the case of the glass flakes at the interface between glass body and deposited $SiO_2$. Owing to the high softening point, the deposited $SiO_2$ sheath gives the substrates the requisite mechanical stability, even during calcination above 700° C. The adhesion of the coating(s) following the $SiO_2$ layers is also very good, even above 700° C.

The thickness of the $SiO_2$ layer on the substrate can be varied in broad ranges, depending on the desired effect. The $SiO_2$ layer has thicknesses of 5-350 nm, preferably of 5-150 nm. For control of gloss and tinting strength, layer thicknesses of 30-100 nm are preferred.

The $SiO_2$ layer may also be doped with carbon-black particles, inorganic coloured pigments and/or metal particles, so long as this doping is stable in air or under inert gas at temperatures >700° C. The proportion of dopant in the $SiO_2$ matrix is then 1-30% by weight, preferably 2-20% by weight, in particular 5-20% by weight.

The glass flakes, with or without stabilising $SiO_2$ layer, are subsequently coated with one or more layers. The layers are preferably layers of metal, metal oxide, metal suboxide, metal oxynitride, metal sulfide, BiOCl and/or rare earths, alone or combinations thereof. The glass flakes are particularly preferably provided with a high-refractive-index coating, for example with $TiO_2$, $ZrO_2$, $SnO_2$, ZnO, $Ce_2O_3$, $Fe_2O_3$, $Fe_3O_4$, $Cr_2O_3$, CoO, $Co_3O_4$, $VO_2$, $V_2O_3$, NiO, furthermore with pseudobrookite, titanium suboxides (partially reduced $TiO_2$ with oxidation states from <4 to 2, such as the lower oxides $Ti_3O_5$, $Ti_2O_3$ as far as TiO), titanium oxynitrides, FeO(OH), thin semi-transparent metal layers, for example Al, Fe, Cr, Ag, Au, Pt, Pd, or combinations thereof. The $TiO_2$ layer can be in the rutile or anatase modification, preference being given to rutile layers. Rutile is preferably prepared by the process from EP 0 271 767.

If the glass flakes are coated with a metal-oxide layer, it is, in particular, $TiO_2$, $Fe_2O_3$, $Fe_3O_4$, $SnO_2$, $ZrO_2$, $Cr_2O_3$ or pseudobrookite. Particular preference is given to titanium dioxide.

In the case of multilayered pigments based on glass flakes (with or without $SiO_2$ protective layer) having two, three, four, five, six, seven or more layers, interference packages consisting of alternating high- and low-refractive-index layers are preferably applied to the surface. Multilayered pigments of this type have increased gloss and a further increased interference colour compared with the monocoated pigments.

In this application, high-refractive-index coatings are taken to mean layers having a refractive index of >1.8, and low-refractive-index layers are taken to mean those where $n \leq 1.8$.

The thickness of the individual layers depends on the desired interference colour. The thickness of the layer is preferably 60-300 nm.

Suitable as high-refractive-index layer are preferably metal oxides, such as, for example, with $TiO_2$, $ZrO_2$, $SnO_2$, ZnO, $Ce_2O_3$, $Fe_2O_3$, $Fe_3O_4$, $Cr_2O_3$, CoO, $Co_3O_4$, $VO_2$, $V_2O_3$, NiO.

Suitable as colourless low-refractive-index materials are preferably metal oxides or the corresponding oxide hydrates, such as, for example, $SiO_2$, $Al_2O_3$, AlO(OH), $B_2O_3$, compounds such as $MgF_2$, $MgSiO_3$, or a mixture of the said metal oxides.

Particularly preferred multilayered pigments have a layer sequence comprising $TiO_2$—$SiO_2$—$TiO_2$.

Suitable effect pigments may furthermore also have a semi-transparent metal layer as outer layer. Coatings of this type are disclosed, for example, in DE 38 25 702 A1. The metal layers are preferably chromium or aluminium layers having layer thicknesses of 5-25 nm.

Furthermore, high-refractive-index layers that can be used are also colourless high-refractive-index materials, such as, for example, metal oxides, in particular $TiO_2$ and $ZrO_2$, which are coloured with heat-stable absorbent colorants, such as, for example, red iron oxide, Thénard's Blue. The absorbent colorants may also be applied to the high-refractive-index coating as a film. Berlin Blue and Carmine Red are preferably applied to the pre-calcined $TiO_2$ and $ZrO_2$ layers. Examples of such coatings are disclosed, for example, in DE 23 13 332.

Particularly preferred effect pigments based on glass flakes are mentioned below:

glass flake+$TiO_2$
glass flake+$Fe_2O_3$
glass flake+$Fe_3O_4$
glass flake+$Cr_2O_3$
glass flake+pseudobrookite
glass flake+$TiO_2$+Prussian Blue
glass flake+$TiO_2$+Carmine Red
glass flake+$TiO_2$+$SiO_2$+$TiO_2$
glass flake+$TiO_2$+Cr
glass flake+$SiO_2$+$TiO_2$
glass flake+$SiO_2$+$Fe_2O_3$
glass flake+$SiO_2$+$Fe_3O_4$
glass flake+$SiO_2$+$Cr_2O_3$
glass flake+$SiO_2$+pseudobrookite
glass flake+$SiO_2$+$TiO_2$+Prussian Blue
glass flake+$SiO_2$+$TiO_2$+Carmine Red
glass flake+$SiO_2$+$TiO_2$+$SiO_2$+$TiO_2$
glass flake+$SiO_2$+$TiO_2$+Cr
glass flake+$TiO_2$+$SiO_2$
glass flake+$Fe_2O_3$+$SiO_2$
glass flake+$Fe_3O_4$+$SiO_2$
glass flake+$Cr_2O_3$+$SiO_2$
glass flake+pseudobrookite+$SiO_2$
glass flake+$TiO_2$+Prussian Blue+$SiO_2$
glass flake+$TiO_2$+Carmine Red+$SiO_2$
glass flake+$TiO_2$+$SiO_2$+$TiO_2$+$SiO_2$
glass flake+$TiO_2$+Cr+$SiO_2$
glass flake+$SiO_2$+$TiO_2$+$SiO_2$
glass flake+$SiO_2$+$Fe_2O_3$+$SiO_2$
glass flake+$SiO_2$+$Fe_3O_4$+$SiO_2$
glass flake+$SiO_2$+$Cr_2O_3$+$SiO_2$
glass flake+$SiO_2$+pseudobrookite+$SiO_2$
glass flake+$SiO_2$+$TiO_2$+Prussian Blue+$SiO_2$
glass flake+$SiO_2$+$TiO_2$+Carmine Red+$SiO_2$
glass flake+$SiO_2$+$TiO_2$+$SiO_2$+$TiO_2$+$SiO_2$
glass flake+$SiO_2$+$TiO_2$+Cr+$SiO_2$ The effect pigments based on glass flakes can generally be prepared relatively easily.

The metal-oxide layers are preferably applied by wet-chemical methods, where the wet-chemical coating methods developed for the preparation of pearlescent pigments can be used. Methods of this type are described, for example, in DE 14 67 468, DE 19 59 988, DE 20 09 566, DE 22 14 545, DE 22 15 191, DE 22 44, 298, DE 23 13 331, DE 15 22 572, DE 31 37 808, DE 31 37 809, DE 31 51 343, DE 31 51 354, DE 31 51 355, DE 32 11 602, DE 32 35 017 or in further patent documents and other publications known to the person skilled in the art.

In the case of wet coating, the substrate particles are suspended in water, and one or more hydrolysable metal salts or a water-glass solution is (are) added at a pH suitable for hydrolysis, which is selected in such a way that the metal oxides or metal oxide hydrates are precipitated directly onto the flakes without secondary precipitations occurring. The pH is usually kept constant by simultaneous metered addition of a base and/or acid. The pigments are subsequently separated off, washed and dried at 50-150° C. for 6-18 h and optionally calcined for 0.5-3 h, where the calcination temperature can be optimised with respect to the coating present in each case. In general, the calcination temperatures are between 500 and 1000° C., preferably between 600 and 900° C. If desired, the pigments can be separated off after application of individual coatings, dried and optionally calcined and then re-suspended for deposition of the further layers.

If the $TiO_2$ layer is a layer which essentially consists of rutile, full-area or partial coating with $SnO_2$ or partial coating with $SnO_2$ seeds is preferably carried out before the coating with $TiO_2$. This very thin, optically inactive $SnO_2$ layer has thicknesses of at most 10 nm, preferably $\leq 5$ nm.

The $SiO_2$ protective layer, if present, is generally deposited on the substrate by addition of a potassium or sodium water-glass solution at a suitable pH.

Furthermore, the coating can also be carried out in a fluidised-bed reactor by gas-phase coating, where, for example, the processes proposed in EP 0 045 851 and EP 0 106 235 for the preparation of pearlescent pigments can be used correspondingly.

The hue of the effect pigments can be varied in very broad limits through the different choice of the coating quantities or the layer thicknesses resulting therefrom. The fine tuning for a certain hue can be achieved beyond the pure choice of amount by approaching the desired colour under visual or measurement technology control.

In order to increase the light, water and weather stability, it is frequently advisable to subject the finished pigment to post-coating or post-treatment, depending on the area of application. Suitable post-coatings or post-treatments are, for example, the processes described in German patent 22 15 191, DE-A 31 51 354, DE-A 32 35 017 or DE-A 33 34 598. This post-coating further increases the chemical and photochemical stability or simplifies handling of the pigment, in particular incorporation into various media. In order to improve the wettability, dispersibility and/or compatibility with the user media, functional coatings of $Al_2O_3$ or $ZrO_2$ or mixtures thereof can, for example, be applied to the pigment surface. Also possible are organic post-coatings, for example with silanes, as described, for example, in EP 0090259, EP 0 634 459, WO 99/57204, WO 96/32446, WO 99/57204, U.S. Pat. Nos. 5,759,255, 5,571,851, WO 01/92425 or in J. J. Ponjeé, Philips Technical Review, Vol. 44, No. 3, 81 ff. and P. H. Harding J. C. Berg, J. Adhesion Sci. Technol. Vol. 11 No. 4, pp. 471-493.

In order to increase the yellowing inhibition, it is frequently also advisable to apply a final calcined $SiO_2$ or $Al_2O_3$ layer to the effect pigment, as described, for example, in DE 102004039554.

The effect pigment or an effect mixture based on glass flakes is admixed with the plastic in amounts of from 0.1 to 10% by weight, preferably from 0.2 to 4% by weight and very particularly preferably from 0.3 to 2% by weight. The amount of effect pigments added is, however, dependent on the layer thickness and the diameter of the glass flakes. The thermoplastic may of course also comprise a mixture of different effect pigments based on glass flakes. However, the plastic preferably comprises only one effect pigment.

Suitable pigments for the more or less opaque basic colouring of the plastic are in principle all inorganic and organic pigments, individually or in combination of different ones, which are listed, for example, in the Colour Index or are available on the pigment market.

Examples of suitable organic pigments are monoazo pigments, disazo pigments, anthanthrone pigments, anthraquinone pigments, anthrapyrimidine pigments, quinacridone pigments, quinophthalone pigments, diaoxazine pigments, flavanthrone pigments, indanthrone pigments, isoindoline pigments, isoindolino pigments, isoviolanthrone pigments, metal-complex pigments, perinone pigments, perylene pigments, phthalocyanine pigments, pyranthrone pigments, thioindigo pigments, triarylcarbonium pigments.

Examples of suitable inorganic pigments are white pigments, in particular titanium dioxide (C.I. Pigment White 6), zinc white, zinc sulfide, lithopones, lead white; black pigments, in particular iron oxide black (C.I. Pigment Black 11), iron manganese black, spinel black (C.I. Pigment Black 27), carbon black (C.I. Pigment Black 6 and 7) and coloured pigments.

The opaque plastics may also comprise fillers, alone or in combination with the inorganic or organic pigments. All fillers known to the person skilled in the art can be employed, such as, for example, natural and synthetic mica, glass beads or glass powder, nylon powder, pure or filled melamine resins, talc, glasses, kaolin, oxides or hydroxides of aluminium, magnesium, calcium, zinc, BiOCl, barium sulfate, calcium sulfate, calcium carbonate, magnesium carbonate, carbon, and physical or chemical combinations of these substances.

The choice and amount of the "conventional" pigments and/or fillers to be employed in each case is readily possible for the person skilled in the art and depends essentially on the requirements of the ready-coloured plastic part. However, the proportion of conventional pigmentation should, in view of effect design, be selected to be so low that, although effect pigmentations with a low flow line level or no flow lines at all are obtained, the optical effect of extremely bright effect pigments is, however, not reduced excessively.

Possible plastics are all thermoplastically processable moulding compositions known to the person skilled in the art, irrespective of whether they are amorphous, partially crystalline or multiphase. Suitable thermoplastic moulding compositions are, in particular, those as mentioned, for example, in Saechtling, Kunststoff Taschenbuch [Plastics Pocket Book], 27th Edition, Hanser Verlag, Munich, such as, for example, polyethylene, polypropylene, polyamides, polyester, polyester-ester, polyether-ester, polyphenylene ether, polyacetal, polybutylene terephthalate, polymethyl methacrylate, polyvinylacetal, polystyrene, acrylonitrile-butadiene-styrene (ABS), acrylonitrile-styrene-acrylate (ASA), polycarbonate, polyether sulfones and polyether ketones, and copolymers and/or mixtures thereof. Besides the said plastics, moulding compositions comprising casting resins, such as, for example, epoxy resins and acrylic casting resins, are furthermore suitable, for example for gel coats.

The plastic according to the invention is generally prepared by initially introducing the plastic granules into a suitable mixer, wetting them with any additives and then adding and mixing-in the effect pigment. Adhesives, organic polymer-compatible solvents, stabilisers and/or surfactants which are heat-stable under the working conditions can optionally be added to the plastic granules during incorporation of the effect pigment. The plastic is generally pigmented via a colour concentrate (masterbatch) or compound. The mixture obtained in this way can then be processed directly in an extruder or an injection-moulding machine. The mouldings formed during the processing exhibit a very homogeneous distribution of the effect pigment.

The invention also relates to mouldings consisting of the opaque plastic according to the invention comprising effect pigments.

The following examples are intended to explain the invention in greater detail, but without restricting it.

EXAMPLES

Example 1 (Comparison)

A mixture of 0.5 part of effect pigment ($TiO_2$-coated glass flakes having a particle size of 20-200 μm, thickness $\leq 1$ μm) and 99.5 parts of polypropylene granules wetted with 0.2 part of an adhesive are injection-moulded in an injection-moulding machine to give mouldings. The finished moulding exhibits a gloss or glitter effect. Owing to the moulding shape, however, the finished moulding (button) also exhibits a plurality of very interfering weld lines.

Example 2

A mixture of 0.5 part of effect pigment ($TiO_2$-coated glass flakes having a particle size of 20-200 μm, thickness $\leq 1$ μm) and 99.5 parts of polypropylene granules coloured white with 0.5 part of Pigment White 6 and wetted with 0.2 part of an adhesive are injection-moulded as in Example 1 in an injection-moulding machine to give mouldings. In contrast to Example 1, the finished moulding (button) exhibits a gloss or glitter effect, but without visible weld lines.

Example 3

A mixture of 0.7 part of effect pigment ($TiO_2$-coated glass flakes having a particle size of 20-200 μm, thickness $\leq 1$ μm) and 99.3 parts of polypropylene granules coloured white with 0.5 part of Pigment White 6 and 0.2 part of Pigment Blue 15:3 and wetted with 0.2 part of an adhesive are injection-moulded as in Example 1 in an injection-moulding machine to give mouldings. In contrast to Example 1, the finished moulding (button) exhibits a gloss or glitter effect, but without visible weld lines.

Example 4 (Comparison)

0.5 parts of effect pigment ($TiO_2$-coated glass flakes having a particle size of 20-200 μm, thickness $\leq 1$ μm) are mixed with polypropylene granules wetted with 0.2% of adhesive and injection-moulded in an injection-moulding machine to give a visor. In the visor obtained using this formulation, weld lines are very clearly visible owing to the mould and moulding. These greatly impair the overall impression.

Example 5

0.5 parts of effect pigment ($TiO_2$-coated glass flakes having a particle size of 20-200 μm, thickness ≦1 μm) are mixed with a mixture, wetted with 0.2% of adhesive, of 100 parts of a Pigment Blue 15:1 masterbatch (pigment concentration 5% in PE-HD) and 100 parts of a Pigment White 6 masterbatch (pigment concentration 5% in PE-HD) and 300 parts of PP granules (Metocene X50081, Basell GmbH) and injection-moulded in an injection-moulding machine to give a visor. In the colouring obtained in accordance with this formulation, virtually no weld lines can be observed, in contrast to Example 4, and the overall impression is substantially unimpaired.

Example 6

0.6 parts of effect pigment (glass flakes having a particle size of 20-200 μm, thickness ≦1 μm, coated with $TiO_2$ to a blue interference colour) and 0.5 part of a Pigment Blue 15:1 and 0.4 part of a Pigment White 6 are mixed with 500 parts of MABS granules (Terlux 2812 TR, BASF AG) wetted with 0.2% of adhesive and injection-moulded in an injection-moulding machine to give a visor. This formulation exhibits an intense blue effect and virtually no visible flow lines, entirely in contrast to Example 4. The overall impression is substantially unimpaired.

Example 7

1.0 parts of effect pigment ($TiO_2$-coated glass flakes having a particle size of 20-200 μm, thickness ≦1 μm) and 0.005 part of a Pigment Black 7 and 0.4 part of a Pigment White 6 are mixed with 500 parts of PA6 granules (Ultramid B3K, BASF AG) wetted with 0.2% of adhesive and injection-moulded in an injection-moulding machine to give a visor. This formulation exhibits a grey effect, but virtually no visible flow lines, entirely in contrast to Example 4.

The invention claimed is:

1. Opaque plastics, comprising 0.1 to 10% by weight of effect pigments based on glass flakes, which have virtually no visible or no visible flow lines and weld lines and are opaque, and which, for a layer thickness of 1.5 mm, have a transmission of max. 20% measured after adjustment to 100% using a translucer from Gabriel Chemie, wherein the opacity is achieved by adding inorganic or organic pigments, individually or in combination, fillers or a combination thereof, wherein the organic pigments are selected from the group consisting of
monoazo pigments
disazo pigments
anthraquinone pigments
anthrapyrimidine pigments
quinacridone pigments
quinophthalone pigments
diaoxazine pigments
flavanthrone pigments
indanthrone pigments
metal-complex pigments
perinone pigments
perylene pigments
phthalocyanine pigments
pyranthrone pigments
thioindigo pigments and
triarylcarbonium pigments,
and the inorganic pigments are selected from the group consisting of white, black, and coloured pigments selected from the group consisting of
titanium dioxide
zinc white
zinc sulphide
lithopones
lead white
iron oxide black
iron manganese black
spinel black and,
carbon black.

2. Opaque plastics according to claim 1, wherein the glass flake is mono- or multicoated.

3. Opaque plastics according to claim 1, wherein the glass flake is coated with one or more metals, metal oxides, metal suboxides, metal oxynitrides, metal sulfides, BiOC1 and/or rare earths.

4. Opaque plastics according to claim 1, wherein the effect pigment is selected from the group consisting of
glass flake +$TiO_2$
glass flake +$Fe_2O_3$
glass flake +$Fe_3O_4$
glass flake +$Cr_2O_3$
glass flake +pseudobrookite
glass flake +$TiO_2$ +Prussian Blue
glass flake +$TiO_2$ +Carmine Red
glass flake +$TiO_2$ +$SiO_2$ +$TiO_2$
glass flake +$TiO_2$ +Cr
glass flake +$SiO_2$ +$TiO_2$
glass flake +$SiO_2$ +$Fe_2O_3$
glass flake +$SiO_2$ +$Fe_3O_4$
glass flake +$SiO_2$ +$Cr_2O_3$
glass flake +$SiO_2$ +pseudobrookite
glass flake +$SiO_2$ +$TiO_2$ +Prussian Blue
glass flake +$SiO_2$ +$TiO_2$ +Carmine Red
glass flake +$SiO_2$ +$TiO_2$ +$SiO_2$ +$TiO_2$
glass flake +$SiO_2$ +$TiO_2$ +Cr
glass flake +$TiO_2$ +$SiO_2$
glass flake +$Fe_2O_3$ +$SiO_2$
glass flake +$Fe_3O_4$ +$SiO_2$
glass flake +$Cr_2O_3$ +$SiO_2$
glass flake +pseudobrookite +$SiO_2$
glass flake +$TiO_2$ +Prussian Blue +$SiO_2$
glass flake +$TiO_2$ +Carmine Red +$SiO_2$
glass flake +$TiO_2$ +$SiO_2$ +$TiO_2$ +$SiO_2$
glass flake +$TiO_2$ +Cr +$SiO_2$
glass flake +$SiO_2$ +$TiO_2$ +$SiO_2$
glass flake +$SiO_2$ +$Fe_2O_3$ +$SiO_2$
glass flake +$SiO_2$ +$Fe_3O_4$ +$SiO_2$
glass flake +$SiO_2$ +$Cr_2O_3$ +$SiO_2$
glass flake +$SiO_2$ +pseudobrookite +$SiO_2$
glass flake +$SiO_2$ +$TiO_2$ +Prussian Blue +$SiO_2$
glass flake +$SiO_2$ +$TiO_2$ +Carmine Red +$SiO_2$
glass flake +$SiO_2$ +$TiO_2$ +$SiO_2$ +$TiO_2$ +$SiO_2$ and
glass flake +$SiO_2$ +$TiO_2$ +Cr +$SiO_2$.

5. Opaque plastics according to claim 1, wherein the glass flakes have a face diameter of 5 to 400 μm.

6. Opaque plastics according to claim 1, wherein the glass flakes have a thickness of <5 μm.

7. Opaque plastics according to claim 1, wherein the glass flakes have a face diameter of 10-300 μm and a thickness of <3 μm.

8. Opaque plastics according to claim 1, wherein the glass flakes have a face diameter of 20-200 μm and a thickness of <1.5 μm.

9. Opaque plastics according to claim 1, wherein the plastics are thermoplastics or casting resins.

10. Mouldings made from opaque plastics according to claim 1.

11. Opaque plastics according to claim 1, wherein the opacity is achieved by adding inorganic or organic pigments.

12. Opaque plastics according to claim 1, wherein the effect pigments are $TiO_2$ coated glass flakes.

* * * * *